(No Model.)
T. CARABINE.
POT AND LID.
No. 532,361. Patented Jan. 8, 1895.
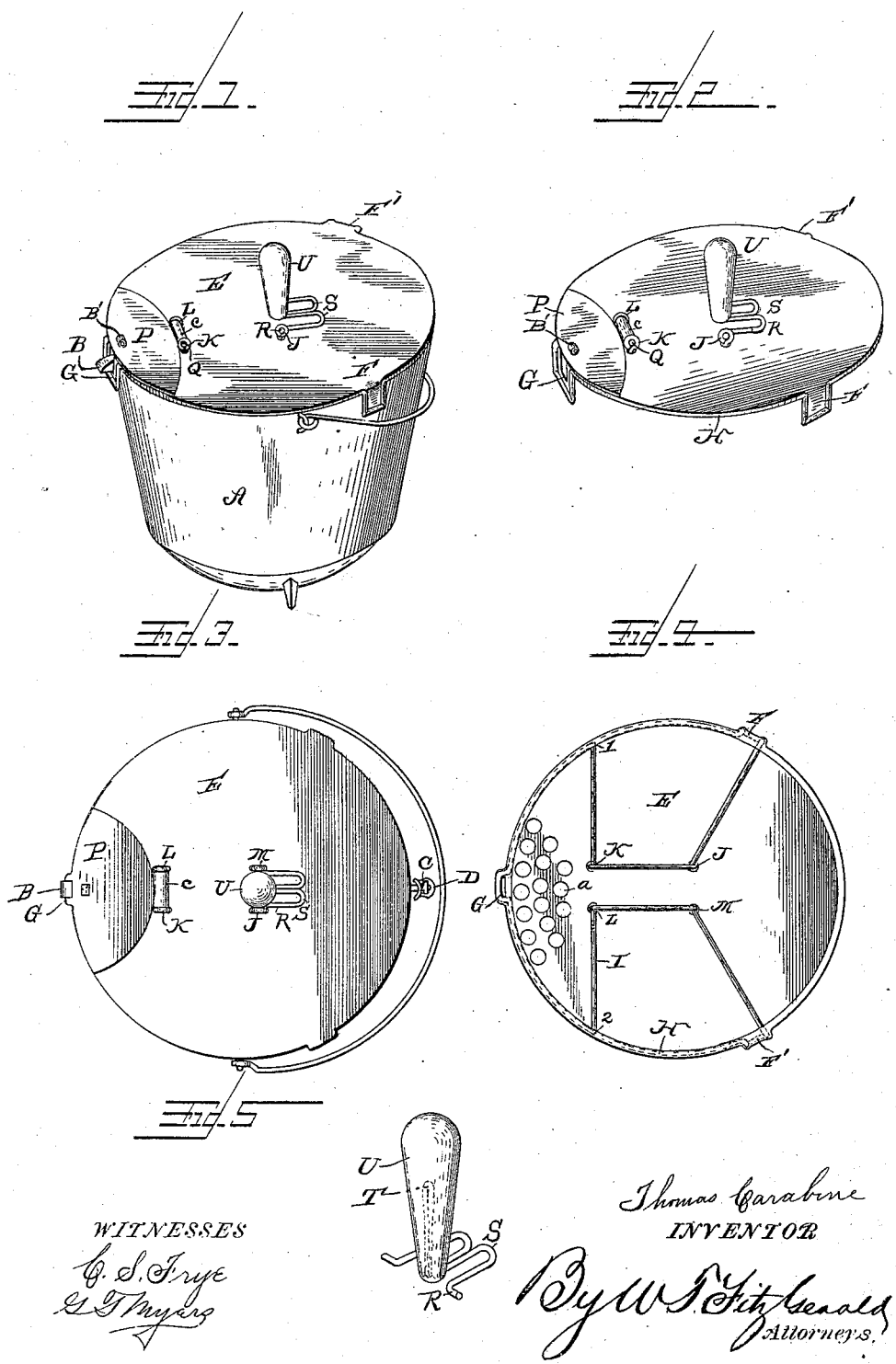

UNITED STATES PATENT OFFICE.

THOMAS CARABINE, OF SPRINGFIELD, MISSOURI.

POT AND LID.

SPECIFICATION forming part of Letters Patent No. 532,361, dated January 8, 1895.

Application filed May 27, 1892. Serial No. 434,637. (No model.)

*To all whom it may concern:*

Be it known that I, THOMAS CARABINE, a citizen of the United States, residing at Springfield, in the county of Greene and State of Missouri, have invented certain new and useful Improvements in Pots and Lids; and I do hereby declare the following to be a full, clear, and exact description of the invention, such as will enable others skilled in the art to which it appertains to make and use the same.

My invention has relation to improvements in pots, and lids therefor; and it has for its general object to so connect a lid to a pot and to provide such means for holding the pot and lid that the latter will be securely held in place when the pot is tilted for pouring the contents therefrom.

A further object of the invention is to so connect a lid to a pot that while the former will be securely held in position upon the pot, it may be readily removed when desired.

Other objects and advantages will be fully understood from the following description and claims when taken in conjunction with the accompanying drawings, in which—

Figure 1, is a perspective view of my improved pot and lid. Fig. 2, is a perspective view of the lid removed. Fig. 3, is a top plan view of the lid and pot. Fig. 4, is an inverted plan view of the lid, and Fig. 5, is a perspective view of the lid handle removed.

In the said drawings, similar letters and figures designate corresponding parts throughout the several views, referring to which—

A, indicates a pot, which may be of the ordinary or any approved general form. This pot A, is provided at its upper edge as illustrated with a horizontally-disposed lateral ear B, and is provided adjacent to its upper edge at a point diametrically opposite to the ear B, with a lug C, which is beaded at its free end as shown and is designed and adapted to support the handle D, which is slotted as shown whereby it will be perceived that it may be swung upward and outward into a horizontal position, when it will afford a convenient handle through the medium of which the pot may be readily tilted.

E, indicates my improved pot lid which is of a corresponding form to the pot and is provided at approximate equi-distant points with two depending ears F, F', and a loop G, which loop is designed and adapted to engage the ear B, while the ears F, F', are designed to bear against the opposite side of the pot to hold the lid firmly in position.

Seated in a bead H, formed on the pot lid at the edge thereof, is a wire I, which serves to strengthen the lid and render the same more rigid. This wire I, the course of which is traced by dotted lines in Fig. 4, of the drawings starts at the point marked 1, and takes through the bead of the lid, thence through the bead of the ear F, thence to a point adjacent to the center of the lid where it takes up through an aperture and is looped to form the bearing J, thence to another point adjacent to the center of the lid where it takes up through the same and is looped to form the bearing K, thence through the bead H, thence through the bead of the loop G, thence through the bead H, to the point 2, thence to a point adjacent to the center of the lid where it takes through the same and is looped to form the bearing L, thence to another point adjacent to the center of the lid where it takes through the same and is looped to form the bearing M, thence to the bead of the ear F', through which it takes and finally through the bead H, to the point marked 2.

Formed in the lid E, and preferably adjacent to the loop G, is a series of apertures a, which are designed for straining the contents of the pot, and are normally covered by the flap P, which is provided upon its upper side with a handle as B', whereby it may be readily lifted. This flap P, is provided upon its inner edge with a barrel as c, through which takes a shaft as Q, which is journaled in the bearing loops K, L, of the wire I, as illustrated whereby it will be perceived that the flap may be freely swung upward when desirable. Journaled in the bearing loops J, M, of the wire I, are the ends of a wire R, which are bent to form the bearing loops S, and the handle loop T, which is disposed at right angles to the loops S, as shown for a purpose presently described. This handle loop T, serves for the connection of the hand grasp U, as shown.

In practice when the lid is in position upon the pot and it is desired to tilt the latter to pour the contents therefrom the attendant grasps the handle D, with the right hand, and the hand grasp U, with the left hand when it will be seen that the bearing loops S, will press upon the lid and hold the ears F, F', securely in engagement with the pot.

By reason of the flap P, being pivotally connected to the lid, E, as described, it will raise and uncover the apertures $a$, under pressure of the steam whereby it will be perceived that the pot will be effectually prevented from boiling over.

Although I have, in some instances, specifically described the construction and relative arrangement of the several elements of my improved pot and lid, yet I do not desire to be confined to the same as such changes or modifications may be made as fairly fall within the scope of my invention.

Having thus described my invention, what I claim, and desire to secure by Letters Patent, is—

1. The combination with a pot having the lateral ear B, adjacent to its upper edge, and a handle at an approximate diametrically opposite point; of a lid having the loop G, engaging the ear B, of the pot and also having the depending ears F, F', the wire R, pivotally connected to the lid and having the bearing loops S, and the handle loop T, and the hand grasp connected to the handle loop, substantially as specified.

2. A pot lid substantially as described comprising the loop G, the depending ears F, F', the wire I, forming the bearing loop J, M, the wire R, journaled in the loop J, M, and having the bearing loops S, and the handle T, and the hand grasp connected to said loop substantially as specified.

In testimony whereof I affix my signature in presence of two witnesses.

THOMAS CARABINE.

Witnesses:
L. A. BAITY,
J. C. DIXON.